(12) United States Patent
Ratsos et al.

(10) Patent No.: US 7,975,383 B2
(45) Date of Patent: Jul. 12, 2011

(54) DOUBLE HYDROFORMED TUBE WITH INTEGRAL REINFORCEMENT

(75) Inventors: Lou Ratsos, Commerce Township, MI (US); James Lowe, Temperance, MI (US); John Reed, Hudson, OH (US); Lawrence Queener, Pinckney, MI (US); Sergio Angotti, Canton, MI (US); Ramakrishna Koganti, Canton, MI (US); Bryan Mikula, Dexter, MI (US); Dean Gericke, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1125 days.

(21) Appl. No.: 11/495,470

(22) Filed: Jul. 28, 2006

(65) Prior Publication Data

US 2008/0028614 A1 Feb. 7, 2008

(51) Int. Cl.
*B21D 53/88* (2006.01)

(52) U.S. Cl. ............ 29/897.2; 29/525.14; 29/421.1; 29/748; 72/58; 72/61

(58) Field of Classification Search .......... 29/897.2, 29/421.1, 525.14; 165/170; 219/121.63; 228/117, 118; 72/61
See application file for complete search history.

(56) References Cited

U.S. PATENT DOCUMENTS

| | | | | |
|---|---|---|---|---|
| 2,759,246 A | * | 8/1956 | Campbell | 29/889.72 |
| 3,201,861 A | * | 8/1965 | Fromson et al. | 29/455.1 |
| 5,078,439 A | * | 1/1992 | Terada et al. | 293/122 |
| 5,240,376 A | * | 8/1993 | Velicki | 416/229 A |
| 5,881,459 A | * | 3/1999 | Yasui | 29/897.32 |
| 6,247,344 B1 | * | 6/2001 | Eipper | 72/61 |
| 7,287,788 B2 | * | 10/2007 | Caliskan et al. | 293/102 |
| 7,368,680 B2 | * | 5/2008 | Sakurai et al. | 219/117.1 |
| 2001/0020609 A1 | * | 9/2001 | Kummle | 219/121.63 |
| 2002/0162877 A1 | * | 11/2002 | Dziadosz et al. | 228/117 |
| 2002/0166222 A1 | * | 11/2002 | Kojima et al. | 29/421.1 |
| 2003/0094026 A1 | * | 5/2003 | Hama et al. | 72/61 |
| 2004/0048013 A1 | * | 3/2004 | Gehrig et al. | 428/34.1 |
| 2004/0194523 A1 | * | 10/2004 | Birkert et al. | 72/61 |
| 2004/0200550 A1 | * | 10/2004 | Pfaffmann et al. | 148/526 |
| 2004/0262930 A1 | * | 12/2004 | Cumming et al. | 293/120 |
| 2006/0066133 A1 | * | 3/2006 | Ueno et al. | 296/187.01 |
| 2008/0052908 A1 | * | 3/2008 | Reed et al. | 29/897.2 |

\* cited by examiner

*Primary Examiner* — David P Bryant
*Assistant Examiner* — Jacob J Cigna
(74) *Attorney, Agent, or Firm* — Frederick Owens, Esq.; Miller Law Group, PLLC

(57) ABSTRACT

A hydroforming process forms a hydroformed automotive component as a multiple cell member having an integral internal rib separating the cells and reinforcing the hydroformed component to increase the strength of a hydroformed component with a given size and shape. The tubular blank can be manufactured through a roll-forming process or by welding two structural tubular members, to form a tubular blank that has multiple cells with an internal rib separating the cells. The hydroforming process injects fluid under pressure into each of the cells to expand the tubular blank into the shape defined by the die holding the blank. The internal web separating the cells of the blank becomes an integral internal reinforcement spanning the component to enhance the strength, rigidity and stiffness of the component. Providing differential pressure on the multiple cells can stretch and twist the internal rib for positioning internally as desired.

13 Claims, 4 Drawing Sheets

Fig. 1 (Prior Art)
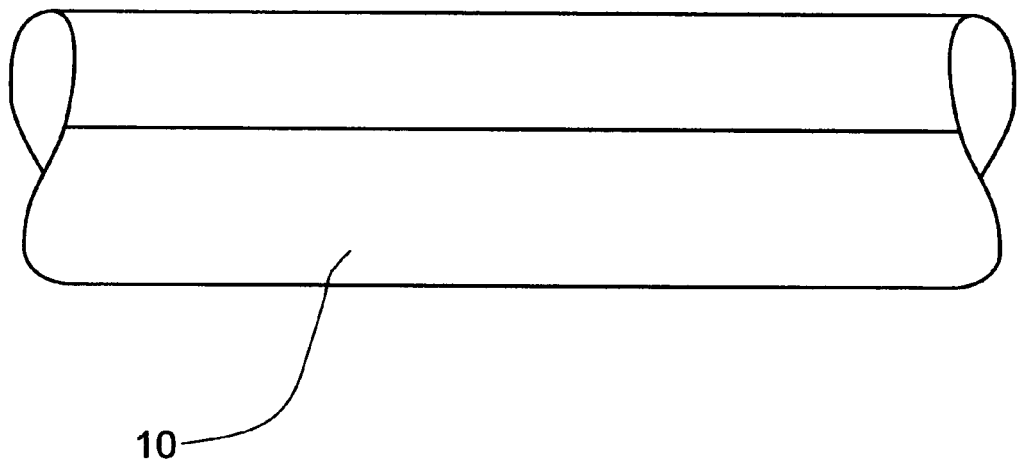
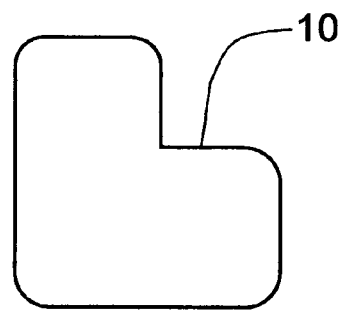
Fig. 2 (Prior Art)

Fig. 3
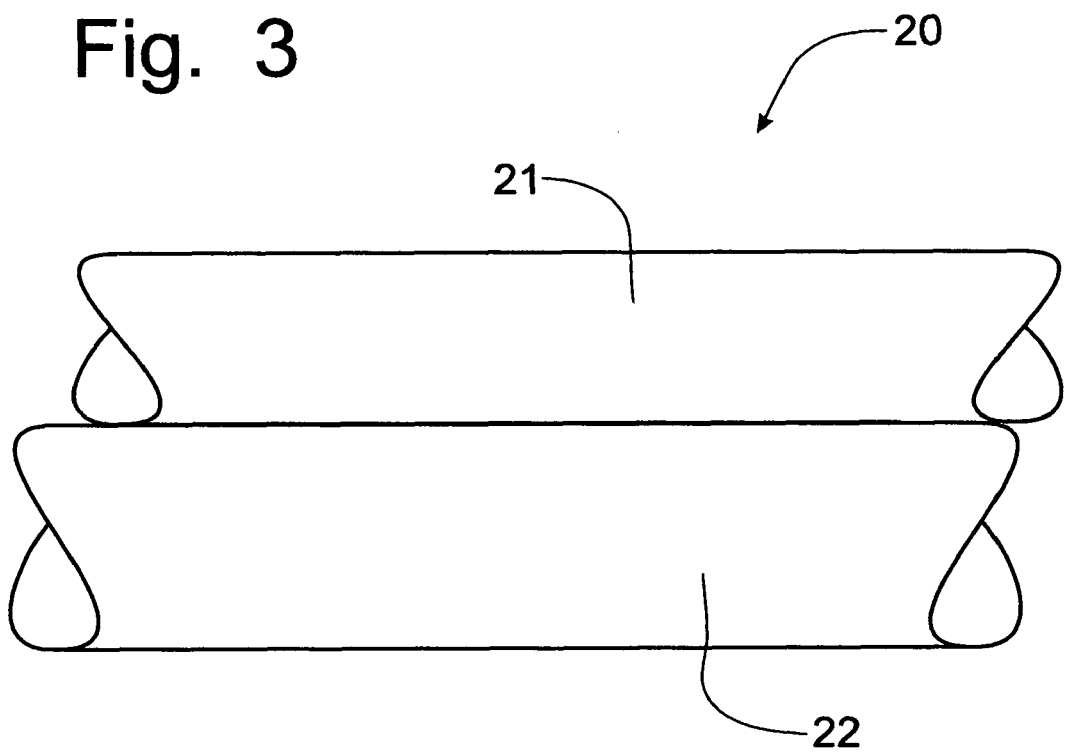
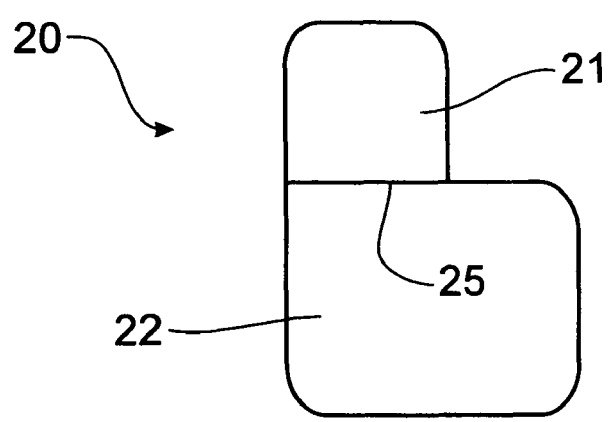
Fig. 4

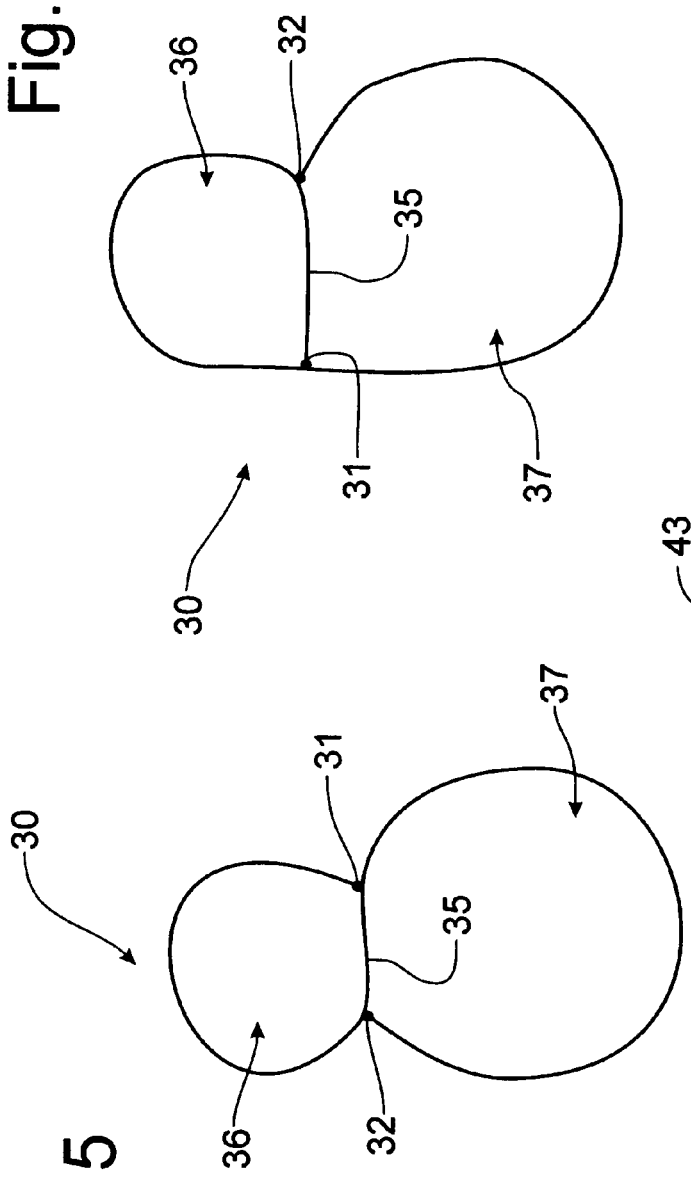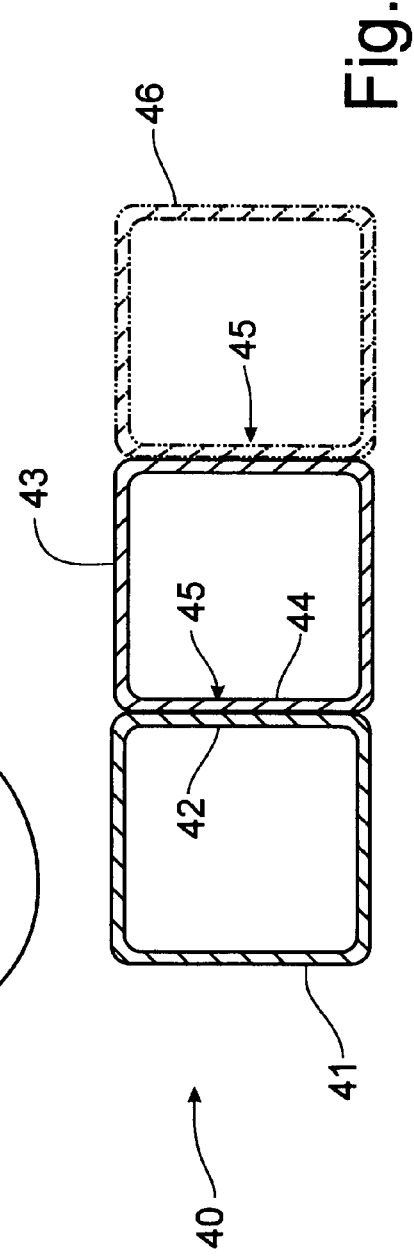

DOUBLE HYDROFORMED TUBE WITH INTEGRAL REINFORCEMENT

BACKGROUND OF THE INVENTION

Manufacturing processes for automobiles have evolved from one that utilized primarily stamped and bent sheet metal pieces that were welded together through a MIG welding processes, i.e. a welding process in which a line of molten material is deposited by the welder in joining two pieces of metal together. Now, conventional automobile manufacturing processes incorporate in a greater degree hydroformed tubular members that are shaped to fit into the chassis of an automobile in a desired manner. The hydroformed members are particularly conducive to being welded through a spot-welding process, which involves the passage of electrical current between two electrodes to melt and join two pieces of metal placed between the electrodes. Spot-welding requires a frame design having appropriate access holes that is conducive to being manufactured using the spot-welding process. For example, if two tubular members are being spot-welded together, access to the adjoining walls of the two tubular members by the spot-welder electrodes must be provided. Other welding techniques, such as gas metal arc welding (GMAW), are also be utilized for welding tubular designs.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. Once the hydroformed part is formed, attachment brackets are attached to the part to permit other components of the automobile to be mounted. Typically, these attachment brackets are welded to the hydroformed part by either a MIG or spot-welding process, whereupon the other components can then be bolted or welded to the attachment brackets.

The automotive body component hydroforming manufacturing process can start with a sheet metal tube, which can be provided in a large variety of sizes and shapes, as well as material thickness and grade. The sheet metal tube can be formed through a roll-forming process in which the sheet metal is rolled into the desired generally cylindrical shape and edge welded along the seam where one edge of the rolled sheet metal adjoins the opposing edge, thereby forming a tubular member that can be hydroformed into the desired shape and configuration. The shape of the hydroformed member is controlled by the shape of the die in which the tubular blank is placed before the blank is hydroformed into the desired shape. The interior of the hydroformed member is hollow, being formed from a tubular blank. Increased strength can be obtained by welding adjacent tubes together or by welding reinforcements to the hydroformed member.

Accordingly, it would be desirable to provide a hydroforming process by which multiple tubular cells can be formed in a single structural hydroformed component to provide integral internal reinforcements and increased structural strength with a given size and shape for the exterior of the hydroformed member.

SUMMARY OF THE INVENTION

It is an object of this invention to overcome the aforementioned disadvantages of the known prior art by providing a process for forming a hydroformed component that forms the component with multiple cells.

It is another object of this invention to provide a hydroformed structural member that will be formed with an integral interior reinforcement as part of the hydroforming manufacturing process.

It is still another object of this invention to form the tubular blank from a roll-forming process that forms the tubular blank from which the hydroformed component is to be manufactured into a tubular member with multiple cells.

It is an advantage of this invention that a hydroformed component can be have increased strength for a given size and shape due to an integral internal reinforcement separating the cells of the hydroformed component.

It is another advantage of this invention that the cost of manufacturing automobiles can be reduced.

It is another feature of this invention that the hydroformed component can be manufactured with an internal rib forming a reinforcement along the entire length of the component.

It is still another feature of this invention that the roll-formed tubular blank is formed in a fashion that creates two cells with a rib member separating the two cells.

It is still another advantage of this invention that the hydroformed component manufactured into multiple cells with an internal rib separating the cells reinforcing the component to increase strength, rigidity and stiffness of the hydroformed component, while maintaining a predetermined size and shape.

It is yet another advantage of this invention that the disclosed manufacturing process combines two known manufacturing technologies, roll-forming and hydroforming, to create a multiple cell hydroformed component.

It is another advantage of this invention that the hydroformed component can be formed according to the instant invention to enhance the structural properties of the component without adding additional parts or external reinforcements to the component.

It is a further object of this invention to provide a process structure that creates a hydroformed automotive component with multiple cells having an integral internal rib reinforcement as part of the hydroforming manufacturing process that is durable in construction, inexpensive of manufacture, carefree of maintenance, facile in assemblage, and simple and effective in use.

These and other objects, features and advantages are accomplished according to the instant invention by providing a hydroforming process for forming a hydroformed automotive component as a multiple cell member having an integral internal rib separating the cells and reinforcing the hydroformed component to increase the strength of a hydroformed component with a given size and shape. The tubular blank can be manufactured through a roll-forming process or by welding two structural tubular members, to form a tubular blank that has multiple cells with an internal rib separating the cells. The hydroforming process injects fluid under pressure into each of the cells to expand the tubular blank into the shape defined by the die holding the blank. The internal web separating the cells of the blank becomes an integral internal reinforcement spanning the component to enhance the strength, rigidity and stiffness of the component. Providing differential pressure on the multiple cells can stretch and twist the internal rib for positioning internally as desired.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a representative side elevational view of a prior art hydroformed automotive frame component formed from a tubular blank;

FIG. 2 is an end view of the prior art hydroformed component depicted in FIG. 1;

FIG. 3 is a side elevational view of a hydroformed automotive frame component formed from a tubular blank manufactured through a roll-forming process in accordance with the principles of the instant invention to establish a double cell frame component with an integral internal reinforcement separating the two cells;

FIG. 4 is an end view of the hydroformed frame component depicted in FIG. 3;

FIG. 5 is a diagrammatic end view of a first embodiment of the roll-formed tubular blank used to create the hydroformed frame component depicted in FIGS. 3 and 4;

FIG. 5A is a diagrammatic end view of a second embodiment of the roll-formed tubular blank used to create the hydroformed frame component depicted in FIGS. 3 and 4;

FIG. 6 is a cross-sectional view of a tubular blank formed by welding together tubular members, an optional third tubular member being shown in phantom;

DETAILED DESCRIPTION OF THE PREFERRED EMBODIMENT

Figure 9:
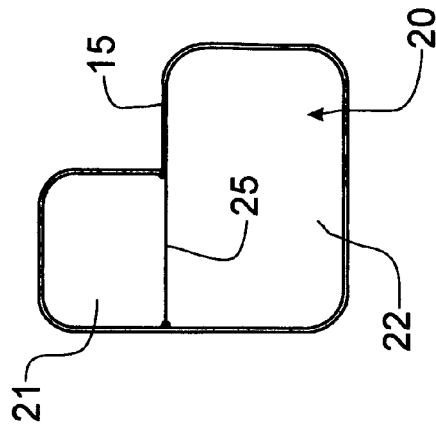
FIG. 9 is a diagrammatic end view of the finished hydroformed component formed with dual cells and an internal reinforcement rib between the two cells.

Referring to FIGS. 1-2, a known representative frame component used in the manufacture of an automobile can be seen. The final hydroformed component 10 is formed through the known hydroforming process into a shaped member having a predetermined shape and size, as reflected in the cross-sectional view of FIG. 2. The automobile into which this frame member 10 is utilized has a frame design that requires a component with this particular shape, size and configuration. This prior art frame component 10 has certain structural properties defining the strength, rigidity and stiffness for the component 10. To increase the strength or other properties of this particular component 10, external reinforcements (not shown) or additional parts (not shown) would be added strategically to the component 10 as needed. Such additional parts or reinforcements add manufacturing steps, and additional materials to attain the requisite structural properties, and thus, increase the cost of manufacturing the component and the automotive vehicle into which this component 10 is assembled.

Referring to FIGS. 3 and 4, a dual cell hydroformed automotive frame component 20 incorporating the principles of the instant invention can be seen. The dual cell component 20 has the same exterior predetermined size, shape and configuration as the previously known component 10, depicted in FIGS. 1 and 2, but is formed with a first cell 21, a separate second cell 22 and a reinforcement rib 25 dividing the two cells 21, 22. This dual cell component 20, due to the internal reinforcement rib 25, has greater strength, rigidity and stiffness as compared to the conventional hydroformed member 10 shown in FIGS. 1 and 2, yet has the same external appearance and can be easily substituted into the automotive design. The dual cell member 20 is manufactured through a hydroforming process that will be described in greater detail below.

The instant invention combines two distinct manufacturing processes to create the dual cell hydroformed component 20. The tubular blank 30 is formed in multiple cells prior to be subjected to the hydroforming process. The tubular blank can be created through a roll-forming process that creates a dual cell tubular blank 30, as can be seen best in FIGS. 5 and 5A. In FIG. 5, the roll-forming process starts with a flat piece of sheet metal parent material (not shown) and instead of rolling the sheet metal into a simple hollow tube, forms a dual cell blank 30. The sheet metal parent material that is formed into the blank 30 begins with a first end 31 and an opposing second end 32. From the first end 31, the parent material is rolled into a circular configuration that forms the upper cell 36 from a portion of the sheet metal. The roll-forming process continues to form the lower cell 37 in a generally circular configuration terminating with the second end 32 mating against the side of the upper cell 36 where the second end 32 is welded to the outside of the second cell 36. The first end 31 is then welded to the outside of the lower cell 37 at a position that is spaced from the second end 32 with an intermediate strip 35 of the parent material extending between the first and second ends 31, 32. Since the dual cell blank 30 is formed from a continuous piece of sheet metal parent material extending from the first end 31 to the second end 32, the strip 35 is an integral part of the blank 30. Furthermore, the strip 35 forms the barrier between the upper and lower cells 36, 37.

An alternative configuration for the dual cell tubular blank 30 can be seen in FIG. 5A. The first end 31 is rolled into generally circular upper cell 36 and then into the generally circular lower cell 37. The first end 31 is welded to a point on the sheet metal to define the first cell 36, while the second end 32 is welded along the upper cell 36 at a distance spaced from the first end 31 such that the strip of sheet metal becoming the barrier 35 between the upper and lower cells 36, 37 extends from the first end 31, rather than along an intermediate strip of the sheet metal per the configuration of FIG. 5. Either configuration of the dual cell blank 30 works satisfactorily in the hydroforming process; however, certain characteristics of one configuration may be desired over the other, as can be recognized below.

Alternate, more conventional, manufacturing methods can be used to create the tubular blank 40. For example, as seen in FIG. 6, two tubular members 41, 43, particularly square tubing, can be welded together with the two co-joined sides 42, 44 of the respective tubes 41, 43 forming the internal rib 45 of the tubular blank 40. The two tubes 41, 43 do not have to be the same size, or even be rectangular, so long as two adjacent sides 42, 44 can be welded together to form a multiple cell tubular blank 40. This concept of welding tubes together can be expanded to create a tubular blank 40 with more than two cells by welding a third tube 46, shown in phantom in FIG. 6, or yet additional tubes (not shown) to the second tube 44.

The hydroforming process is substantially the same as the conventional process, except that special end caps (not shown) are required to permit the introduction of fluid under pressure into each of the cells 36, 37 of the dual cell blank 30 independently. The high pressure fluid in each of the cells 36, 37 acts to push the sheet metal defining each respective cell 36, 37 outwardly onto the surface of the die 15 so that the end result of the process is the desired exterior shape of the hydroformed component.

Figure 8:
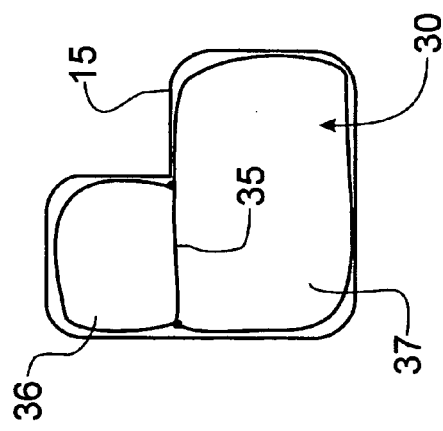
FIG. 8 is a diagrammatic end view of the deformation undertaken by the tubular blank during the hydroforming process.
Figure 7:
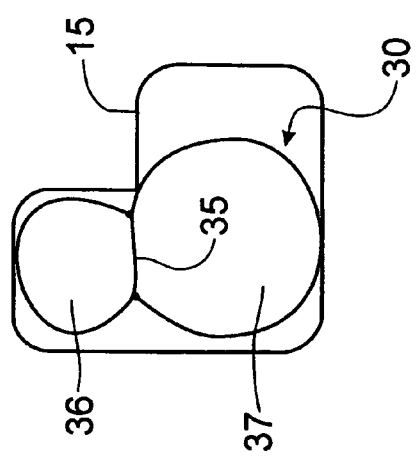
FIG. 7 is a diagrammatic end view of the tubular blank depicted in FIG. 5 placed into a hydroforming die to start the hydroforming process.

As can be seen in FIGS. 7-9, the dual cell tubular blank 30 is placed into the die 15 and fluid injected independently into each of the upper and lower cells 36, 37. The deformation induced by the high pressure fluid is reflected in FIG. 8. The barrier 35 can stretch with the expansion of the upper and lower cells 36, 37 to form the final hydroformed component 20 that has an upper cell 21, a lower cell 22 with an integral internal reinforcement rib 25 positioned between the two cells 21, 22, formed from the stretched barrier 35. The internal reinforcement rib 25 substantially adds to the strength of the component 20, as compared to the conventionally formed component 10, without adding significantly to the cost of producing the hydroformed component 20. Essentially the only extra costs associated with the production of such a dual cell hydroformed component 20 is the slightly additional length of sheet metal required to form the barrier 35 and the extra weld needed to weld the first and second ends 31, 32 to the sides of the cells 36, 37, as opposed to a single weld to each other to form a conventional single cell tubular blank.

Figure 12:
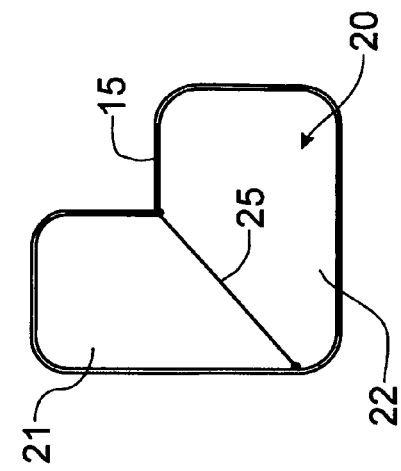
FIG. 12 is a diagrammatic end view of the finished hydroformed component formed with dual cells and a displaced internal reinforcement rib between the two cells.
Figure 11:
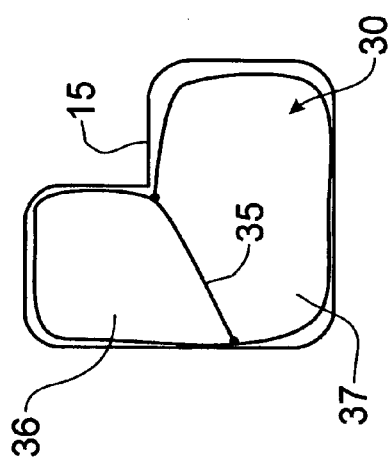
FIG. 11 is a diagrammatic end view of the deformation undertaken by the tubular blank during the hydroforming process with differential pressure placed in the two cells of the tubular blank.
Figure 10:
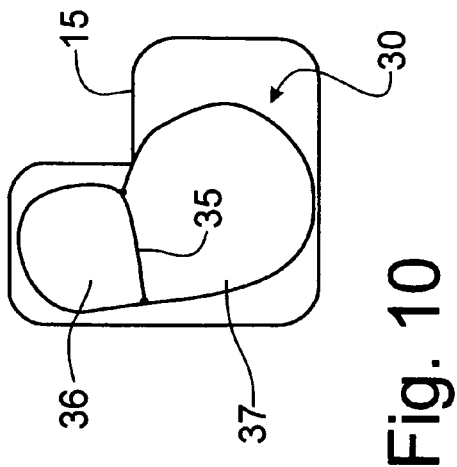
FIG. 10 is a diagrammatic end view of the tubular blank depicted in FIG. 6 placed into a hydroforming die to start the hydroforming process.

One skilled in the art will recognize that a differential in the pressure exerted on the fluids in the respective cells 36, 37 during the hydroforming process can provide a surprising result. As can be seen in FIGS. 10-12, the dual cell tubular blank 30 can be placed into a forming die 15 and fluid injected under high pressure into each of the cells 36, 37 independently. By increasing the pressure of the upper cell 36 relative to the lower cell 37, the position of the barrier 35 forming the reinforcement rib 25 can be displaced or twisted within the die. As is reflected in FIG. 11, the deformation of the upper and lower cells 36, 37 due to the high pressure fluid injected therein expands the sheet metal cells 36, 37 outwardly against the surface of the forming die 15. However, a higher differential pressure in the upper cell 36 can push the unsupported first end 31 of the blank 30 into the lower cell 37 to cause a deflection or a twisting of the barrier 35. The final result is depicted in FIG. 12 with the integral internal reinforcement rib being oriented in a diagonally extending position to provide different strength and stiffness characteristics than the configuration depicted in FIG. 9.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of forming an automotive support member comprising the steps of:
   providing a multiple cell tubular blank having at least a first cell, a contiguous second cell and a barrier between the first and second cells extending a entire length dimension of the tubular blank;
   placing the multiple cell tubular blank in a forming die having a shaped internal cavity; and
   hydroforming the tubular blank by injecting fluid under pressure into each of the cells independently such that the pressure of the fluid in one of the cells can be different than the pressure of the fluid n an adjacent cell so that each cell assumes the shape of a portion of the internal cavity with the barrier forming a reinforcing rib spanning internally of the support member, the barrier being internally deformable into the cell having the lower fluid pressure.

2. The method of claim 1 wherein the providing step includes the steps of:
   roll-forming the dual cell tubular blank from sheet metal parent material to create the first and second cells;
   welding a first end of the parent material to a first point on the parent material at a first weld joint; and
   welding a second end of the parent material to a second point on the parent material at a second weld joint spaced from the first weld joint to define the barrier between the first and second weld joints.

3. The method of claim 1 wherein the providing step includes the step of:
   welding a first portion of a first tubular member to a corresponding first portion of a second tubular member to form the tubular blank such that the two first portion are welded together to form the barrier of the tubular blank.

4. The method of claim 2 wherein the welding steps are spaced along an intermediate portion of the parent material such that the barrier is formed from the intermediate portion of the parent material.

5. The method of claim 2 wherein the step of welding a second end places the second weld joint at a point on the parent material spaced from the first weld joint such that the barrier is formed from an end portion of the parent material beginning with the first end.

6. The method of claim 3 wherein the tubular members are rectangular.

7. The method of claim 3 wherein the tubular members are of disparate sizes.

8. In a method for hydroforming an automotive frame component into a desired shape, the improvement comprising the step of:
   forming a dual cell tubular blank so as to have a first cell, a second cell and a barrier between the first and second cells, the barrier extending an entire length dimension of the tubular blank;
   placing the dual cell tubular blank into a forming die having a shaped internal cavity formed with first and second portions;
   hydroforming the dual cell tubular blank by injecting fluid under pressure into each of the first and second cells independently such that the first cell assumes the shape of the first portion of the internal cavity while the second cell assumes the shape of the second portion of the internal cavity with the barrier creating a reinforcing rib spanning internally of the support member; and
   controlling the pressure of the fluid in each respective cell independently of the fluid in the other cell positionally locate the barrier within the tubular blank such that the barrier can be deformed into the cell having the lower fluid pressure.

9. The method of claim 8 wherein the forming step includes the steps of:
   welding a first end of parent sheet material to a first point on the parent material at a first weld joint; and
   welding a second end of the parent material to a second point on the parent material at a second weld joint spaced from the first weld joint to define the barrier between the first and second weld joints.

10. The method of claim 8 wherein the forming steps includes the step of:
    welding a first portion of a first tubular member to a corresponding first portion of a second tubular member to form the tubular blank such that the first portion are welded together to form the barrier of the tubular blank.

11. The method of claim 8 wherein the hydroforming step injects fluid into the first and second cells at a differential pressure.

12. The method of claim 9 wherein the welding steps are spaced along an intermediate portion of the parent material such that the barrier is formed from the intermediate portion of the parent material.

13. The method of claim 9 wherein the step of welding a second end places the second weld joint at a point on the parent material spaced from the first weld joint such that the barrier is formed from an end portion of the parent material beginning with the first end.

* * * * *

UNITED STATES PATENT AND TRADEMARK OFFICE
CERTIFICATE OF CORRECTION

PATENT NO. : 7,975,383 B2  
APPLICATION NO. : 11/495470  
DATED : July 12, 2011  
INVENTOR(S) : Lou Ratsos et al.

Page 1 of 1

It is certified that error appears in the above-identified patent and that said Letters Patent is hereby corrected as shown below:

On the Title Page, Item (73)

The names of the Assignees of this patent should read:

Ford Motor Company of Dearborn, MI, and  
Vari-Form, Inc. of Warren, MI

Signed and Sealed this  
Eighth Day of May, 2012

David J. Kappos  
*Director of the United States Patent and Trademark Office*